Patented Dec. 30, 1941

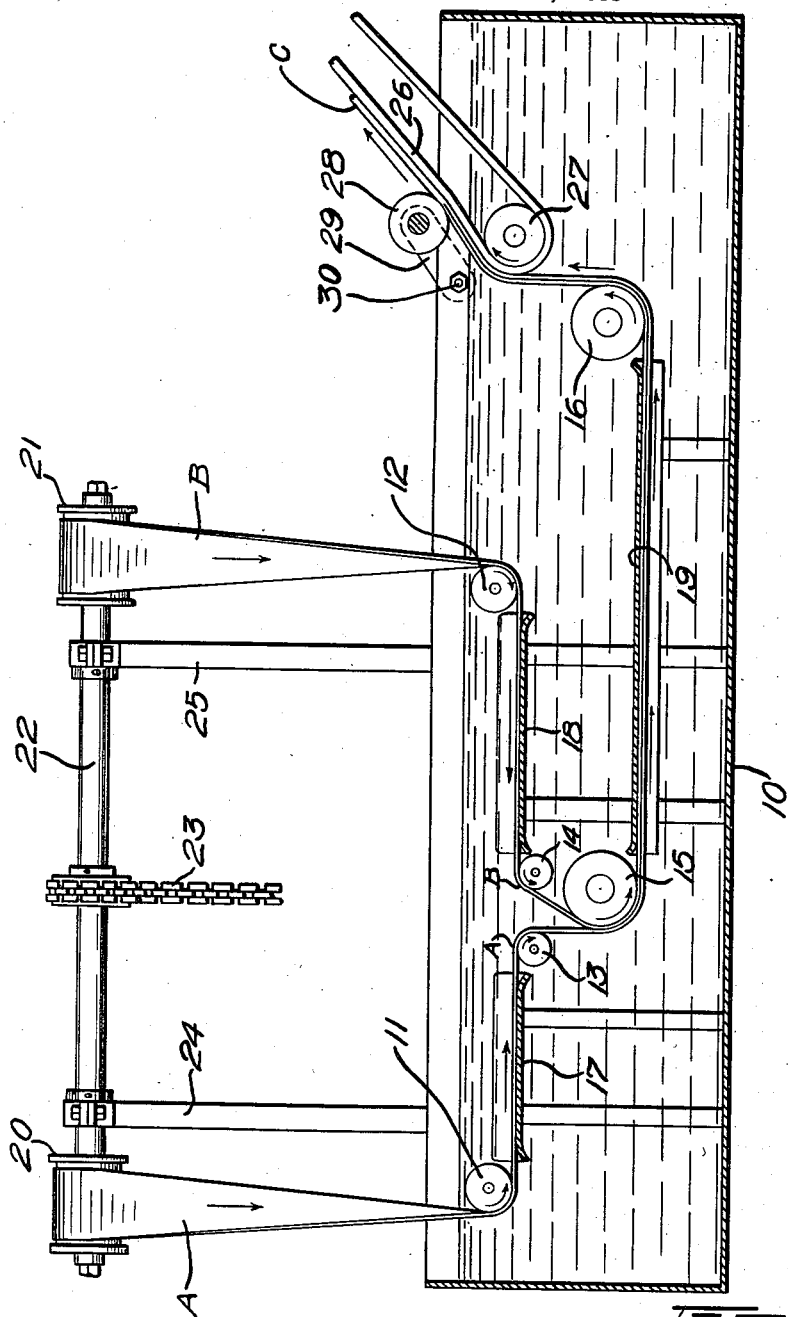

2,267,942

UNITED STATES PATENT OFFICE 2,267,942

METHOD OF AND APPARATUS FOR MAKING SHEET RUBBER

John F. Morse, Hudson, Ohio, assignor to The B. F. Goodrich Company, New York, N. Y., a corporation of New York Application February 24, 1938, Serial No. 192,277

16 Claims. (Cl. 154—1)

This invention relates to the making of sheet rubber and especially to the assembling of plies of sheet rubber coagulum deposited from an aqueous dispersion of rubber.

In depositing sheet rubber coagulum from an aqueous dispersion of the rubber, usually effected by electro-deposition of the rubber or by the use of a chemical substance having a coagulating action, the thickness to which the sheet can be expeditiously deposited is limited, such sheets usually being thin. It is desired for some uses, for example in the making of sheet rubber to be cut into thread, to provide a greater thickness of the rubber sheet by adhering or coalescing two or more of the sheets. Also it is desirable to unite a plurality of the sheets together to distribute in the composite sheet any slight defects that might be present in the individual sheets so that the final sheet will be of more uniform and superior quality. However, when it has been attempted to press or roll the sheets into adhering relation with each other air has often been pocketed between the sheets, resulting in unadhered portions and objectionable blisters.

The chief objects of the present invention are to provide for conveniently assembling such sheets without pocketing air between them; to provide improved procedure; and to provide improved apparatus to these ends. A further object is to provide an improved rubber thread and especially a thread of greater uniformity of strength.

These and other objects will be apparent from the following description, reference being had to the accompanying drawing in which the single figure is a view in vertical longitudinal section of apparatus constructed according to and embodying the invention in its preferred form, suitable for carrying out the preferred method.

I have discovered that the objects of the invention may be fulfilled by assembling the rubber sheets while they are submerged in a suitable liquid such as water, although other liquids, such as alcohol, may be used. Preferably, the sheets are caused to travel for some distance while submerged before they are assembled so that by the movement of the sheet in the liquid, air bubbles or other foreign matter clinging to the surface of the sheet will be removed by the washing action. As rubber coagulum deposited from an aqueous dispersion of rubber is a microporous rubber structure containing for example as high as 40% of water within it, the submersion of the rubber in a bath of water does not hinder the operation of pressing the sheets into adhered relation but rather assists in promoting the adhesion or coalescing. Also, whereas the freshly deposited rubber is ordinarily difficult to handle and guide accurately for aligning the sheets, by submerging them their weight as a factor in providing guiding means is substantially reduced or eliminated, owing to the buoyancy of the rubber in water, these materials having the same or nearly the same specific gravities, so that the guiding or steering can be effected by only light contacting pressure against the sheets.

A preferred form of apparatus for carrying out the invention is illustrated in the drawing. A tank 10 contains a bath of the liquid, preferably water, and within the tank are mounted suitable guiding rollers 11, 12, 13, 14, 15 and 16. Between the rollers 11 and 13, and 12 and 14 are mounted guiding troughs 17 and 18, and between the rollers 15 and 16 is mounted a third guiding trough 19. The trough 19 is shown inverted, which is permissible because it is only for guiding the strips laterally, the weight of the strips being supported by the water. All these rollers and troughs are mounted on suitable supports in a submerged position in the tank. The rollers, troughs and their supports preferably are of a non-corrosive material, such as stainless steel, porcelain or suitable composition, and for facility of cleaning, these parts preferably are removably mounted in the tank.

The sheet rubber may be fed into the tank from above and for this purpose a pair of guiding pulleys 20 and 21 may be mounted upon a shaft 22 which may be driven by a sprocket chain 23 from a suitable source of power (not shown). Preferably the strips are caused to make a quarter turn between pulley 20 and roller 11 and between pulley 21 and roller 12, so that there will be little or no tendency for the strip to wander laterally on the rollers 11 and 12. The shaft 22 may be mounted upon suitable supports 24 and 25. For conducting the material out of the tank a conveyor belt 26 is provided passing around a roller 27 mounted in a submerged position. The conveyor belt preferably extends obliquely upward as shown so that it may conduct away the material and permit water to drop back into the tank. A weighted pressing roller 28 rotating freely upon an arm 29 is pivoted to the tank at 30 in such a position that the roller is adapted to press against material on the belt a short distance after it has emerged from the bath.

A sheet of freshly deposited rubber coagulum A, preferably still containing a large percentage of water, is led over the pulley 20 and down into the bath where it passes under roller 11 through the trough 17 and over roller 13. A second similar sheet of rubber coagulum B is led over the pulley 21 and down into the bath where it passes under the roller 12, through the trough 18 and over the roller 14. Preferably, although not necessarily, the sheets are fed so that the faces thereof that are eventually brought together are the faces that are last deposited in the deposition of the rubber. In making this passage substantially all the air at the surface of the rubber is removed by the washing action of the water. The water lubricates the strips so that they do not stick to the guiding troughs or rollers. Owing to their buoyancy in water, the strips are supported without substantial pressure against the troughs, and the accurate guiding of the sheets into alignment with each other is effected by only light guiding pressure at the troughs.

The sheets A and B are brought together as they pass around roller 15 and are conducted through the trough 19. While the sheets may be pressed together while submerged, I prefer to defer the pressing operation until the assembled sheets have been conducted out of the bath.

Accordingly, the assembled sheets are conducted around roller 16 and up onto the conveyor belt 26 and at this position shortly after the material emerges from the bath the weighted roller 28 presses the assembled sheets against the belt to press them together to constitute an integral rubber sheet C, which is conducted away for further operations as desired. The water that is expressed from the rubber by this pressing operation falls back into the tank.

I have found that at the roller 15, where the rubber strips are first brought into contact, the edges adhere or coalesce so that the two strips become in effect a flattened tube, the inner wall surface portions of which are separated by water. As these wall portions of the tube are brought closer together during their travel to the roller 28 and are finally pressed together at that roller to express what water remains between the wall portions, the relative rearward movement of the water effects a further washing action on the rubber surfaces to be brought together, which is beneficial in making for uniformity in the strength of the union of the strips. Also, the movement of the water at the zone near roller 15, where the strips are first brought together, has the result of keeping foreign matter that the water may carry out of the space between the strips so that when they are brought together the opposing surfaces will be clean and can be intimately united.

The invention is useful especially in the making of rubber thread which may be cut from the sheet C. Such thread is homogeneous in character and at the same time has qualities superior to thread cut from single-thickness deposits of rubber of the same thickness, especially in that any minor imperfection, such as a pinhole or an embedded particle of foreign matter, will not extend entirely through the material, but at the most only half way through in the case of two united sheets, and such chance imperfections in both sheets will ordinarily be staggered in the united structure.

Where substantially clean water is used in the bath so that the opposing surfaces of the rubber can be closely united or coalesced, the union is so intimate that in the subsequently vulcanized material no line or zone of demarcation is ordinarily ascertainable, the material being virtually homogeneous.

In some cases it is desirable to provide a less intimate union between the two sheets so that after vulcanization a separation under some degree of force can be effected. This is advantageous especially in providing rubber thread for uses in which the surface of the thread is likely to become nicked and a thread highly resistant to tearing is desired. By providing multilayer material the advantage of an increased number of surfaces of the rubber is obtained, which surfaces resist continuation of the tear. However, if the layers are strongly united, a rupture of one layer may result in localizing the stretching stress in the remaining layer or layers in the zone adjacent the rupture, whereas if the layers can work loose, at least in the vicinity of the rupture, the stretching stresses are not so objectionably localized in the remaining material. The invention makes possible the obtaining of a union or adhesion between the layers of rubber coagulum that is strong to the point of coalescence or that is sufficiently weak to yield in a case such as that above referred to. I have found that the adhesion may be thus lessened, without sacrificing uniformity in the quality of the product, by incorporating in the bath of water a small amount of adhesion-resisting material, such for example as soap solution, so that when the layers are pressed together the intimacy of the union of the materials of the two layers will be lessened, without however completely preventing adhesion.

These and further variations may be made without departing from the scope of the invention except as it is defined in the following claims.

I claim:

1. The method of making sheet rubber which comprises passing a plurality of plies of freshly deposited rubber coagulum through an aqueous bath to remove air from the surfaces of the plies, and while the plies are submerged progressively bringing them together.

2. The method of making sheet rubber which comprises passing a plurality of plies of water-containing rubber coagulum through a bath comprising water, progressively bringing the plies together while they are submerged and while the surfaces are still wet pressing them together in adhering relation.

3. A method as defined in claim 2 in which an adhesion-resisting substance other than air is incorporated in the bath for deposit upon the plies.

4. Apparatus for making sheet rubber comprising a bath of liquid in which rubber is substantially buoyant, means for conducting a plurality of plies of liquid-containing rubber in extensive strip form into the bath and for progressively bringing the plies together while they are submerged, and means for conducting the material out of the bath and for pressing the plies together in adhering relation while the material is still wet.

5. Apparatus for making sheet rubber comprising a bath of liquid in which rubber is substantially buoyant, means for introducing a plurality of plies of liquid-containing rubber in extensive strip form into the bath, means for guiding the plies in a submerged condition while the plies are substantially supported by the liquid, and means for progressively bringing together the plies while they are submerged.

6. The method of assembling a plurality of plies of flexible plastic material in extensive sheet form which comprises feeding the strips at spaced-apart positions into a liquid bath in which said material is substantially buoyant, moving them in the bath to wash the faces thereof, and progressively bringing the strips together face to face while they are still submerged in the bath.

7. The method of assembling a plurality of plies of rubber coagulum freshly deposited from an aqueous dispersion of the rubber which comprises feeding the strips at spaced-apart positions into a bath of water in which the coagulum is substantially buoyant, moving them submerged in the bath while reaches thereof are supported largely by the water, and bringing the strips together face to face while they are still submerged.

8. The method of making a plied sheet of plastic material which comprises separately feeding a plurality of pliable strips of adhesive plastic composition in extensive sheet form into a bath of a liquid that is a non-solvent of such composition and in which the composition is substantially buoyant, and moving the same in the liquid to wash the surfaces of the strips, progressively directing the strips into face to face relation, and progressively pressing the strips into engagment with each other to express the liquid from between the strips.

9. The method of making a plied sheet of rubber material which comprises separately feeding a plurality of weak pliable strips of rubber coagulum freshly deposited from an aqueous dispersion of the rubber into a bath of water in which the coagulum is substantially buoyant, and moving the strips in the bath to wash the surfaces of the strips while the strips are supported largely by the water, and progressively pressing the strips into engagement with each other to express the liquid therebetween.

10. The method of making a plied sheet of plastic material which comprises separately feeding a plurality of pliable strips of adhesive plastic composition in extensive sheet form into a bath of liquid that is non-solvent of such composition and in which the composition is substantially buoyant, and moving the strips in the bath to wash the surfaces of the strips, directing the strips into face to face relation beneath the surface of the liquid, inducing flow of the liquid away from the bight of the assembled strips as a result of expressing liquid from between the strips.

11. The method of making a plied sheet of flexible material which comprises separately feeding a plurality of pliable strips of the flexible material in extensive sheet form into a bath comprising a liquid which is a non-solvent of the material and in which the material is substantially buoyant, and an adhesion-inhibiting agent and moving the strips in the liquid to wash the surfaces of the strips, progressively directing the strips into face to face relation, and progressively pressing the strips together to express the liquid from between the strips.

12. Apparatus for assembling a plurality of plies of flexible plastic material comprising a bath of liquid in which the material is substantially buoyant, means for feeding the material in extensive strips at spaced-apart positions into the bath, means for guiding the strips while submerged, and means for bringing the strips together face to face while still submerged.

13. Apparatus as defined in claim 12 in which the guiding means is located to contact lightly the edges of reaches of the strips while such reaches are supported largely by the liquid.

14. Apparatus as defined in claim 12, in which the feeding and guiding means cause each strip to make a quarter turn laterally of the direction of feed to maintain steadiness in the direction of feed with a minimum of guiding pressure on the strip.

15. Apparatus for making a plied sheet of plastic material, said apparatus comprising a bath of liquid that is a non-solvent of said material and in which said material is substantially buoyant, means for separately feeding a plurality of the strips into said bath and moving them in the bath to wash the faces thereof, means in said bath for directing the strips into face to face relation, and means for progressively pressing the strips into engagement with each other to express the liquid from between the strips.

16. Apparatus for making a plied sheet of rubber material from rubber coagulum in long-length weak strips freshly deposited from an aqueous dispersion of the rubber, said apparatus comprising a bath comprising water in which the strips of coagulum are substantially buoyant, means for separately feeding a plurality of the strips of coagulum progressively into said bath, means for guiding the strips into face to face contacting relation in the bath by light contact of the guiding means with the strips while they are supported largely by the water, and means for progressively pressing the strips into engagement with one another while expressing the water from between the strips outwardly of the position of initial contact.

JOHN F. MORSE.